(12) United States Patent
Cavalca et al.

(10) Patent No.: US 9,751,284 B2
(45) Date of Patent: Sep. 5, 2017

(54) METHOD FOR MAKING SKINNED POLYURETHANE COMPOSITES

(71) Applicant: DOW GLOBAL TECHNOLOGIES LLC, Midland, MI (US)

(72) Inventors: Sara Cavalca, San Martino in Rio (IT); Sabrina Fregni, Nonantola (IT)

(73) Assignee: Dow Global Technologies LLC, Midland, MI (US)

( * ) Notice: Subject to any disclaimer, the term of this patent is extended or adjusted under 35 U.S.C. 154(b) by 132 days.

(21) Appl. No.: 14/410,091

(22) PCT Filed: Jun. 20, 2013

(86) PCT No.: PCT/US2013/046727
§ 371 (c)(1),
(2) Date: Dec. 21, 2014

(87) PCT Pub. No.: WO2014/011375
PCT Pub. Date: Jan. 16, 2014

(65) Prior Publication Data
US 2016/0016387 A1    Jan. 21, 2016

(51) Int. Cl.
| | |
|---|---|
| *B32B 27/06* | (2006.01) |
| *B32B 25/20* | (2006.01) |
| *B32B 27/08* | (2006.01) |
| *B32B 27/30* | (2006.01) |
| *B32B 27/40* | (2006.01) |
| *B32B 37/14* | (2006.01) |
| *C08G 18/48* | (2006.01) |
| *C08G 18/66* | (2006.01) |
| *C08G 18/72* | (2006.01) |
| *C08G 18/76* | (2006.01) |
| *C08G 18/79* | (2006.01) |
| *C08G 18/10* | (2006.01) |
| *C08G 18/32* | (2006.01) |
| *C08G 18/42* | (2006.01) |
| *C08G 18/68* | (2006.01) |
| *C08J 9/04* | (2006.01) |
| *B32B 5/20* | (2006.01) |
| *C08G 101/00* | (2006.01) |

(52) U.S. Cl.
CPC .............. *B32B 27/065* (2013.01); *B32B 5/20* (2013.01); *B32B 27/08* (2013.01); *B32B 27/304* (2013.01); *B32B 27/40* (2013.01); *B32B 37/14* (2013.01); *C08G 18/10* (2013.01); *C08G 18/3206* (2013.01); *C08G 18/4236* (2013.01); *C08G 18/4816* (2013.01); *C08G 18/4837* (2013.01); *C08G 18/4841* (2013.01); *C08G 18/6677* (2013.01); *C08G 18/725* (2013.01); *C08G 18/7664* (2013.01); *C08G 18/798* (2013.01); *C08J 9/04* (2013.01); *B32B 2266/0278* (2013.01); *B32B 2305/72* (2013.01); *C08G 18/68* (2013.01); *C08G 2101/0016* (2013.01); *C08G 2101/0083* (2013.01); *C08J 2375/04* (2013.01)

(58) Field of Classification Search
CPC .................................. B32B 5/20; C08G 18/68
See application file for complete search history.

(56) References Cited

U.S. PATENT DOCUMENTS

| | | | | |
|---|---|---|---|---|
| 4,176,878 A | * | 12/1979 | Koutsky | .............. B60N 2/4606 297/115 |
| 5,334,448 A | | 8/1994 | Horn | |
| 2008/0234402 A1 | | 9/2008 | Lehmann | |
| 2009/0018226 A1 | * | 1/2009 | Dimitroff | ............... C08G 18/61 521/137 |

FOREIGN PATENT DOCUMENTS

| | | |
|---|---|---|
| DE | 10 2005 041763 A | 3/2007 |
| EP | 0 490 145 A | 6/1992 |

* cited by examiner

Primary Examiner — Melissa Rioja

(57) ABSTRACT

Skinned composites contain a plasticized polymer skin layer adhered to a layer of a polyurethane. The polyurethane is made from a reaction mixture that contains specified amounts of a polyester polyol and an acidic material. The presence of both the polyester polyol and acid leads to significantly improved adhesion between the polyurethane and skin layer. The invention is particularly useful when the skin is highly plasticized.

8 Claims, 1 Drawing Sheet

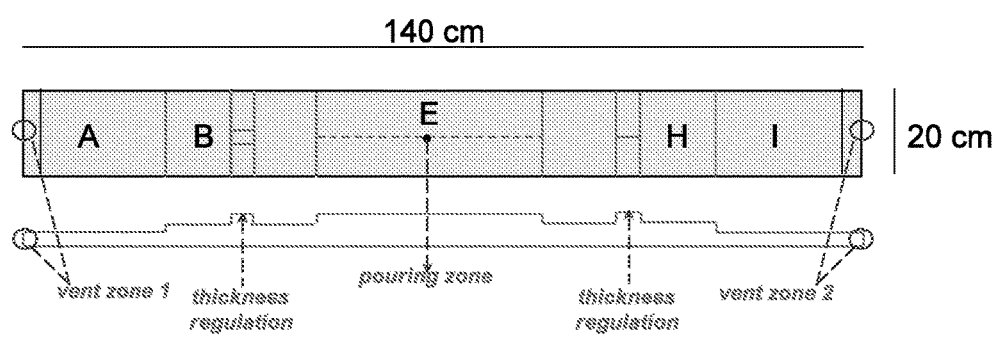

METHOD FOR MAKING SKINNED POLYURETHANE COMPOSITES

This invention relates to a method for making skinned composites that contain a polyurethane foam layer.

Certain automotive interior parts, such as instrument panels, are manufactured with an exterior, decorative skin backed with a layer of semi-flexible polyurethane foam. The skin material is quite often a plasticized poly(vinylchloride) (PVC). Plasticized PVC offers very significant advantages over other materials, when used as the skin material. Plasticized PVC produces a matte surface finish with superior grain retention at an acceptable cost.

In these composites, the PVC skin is bonded directly to a polyurethane foam layer, without use of an intermediate adhesive layer. The polyurethane foam is formed by applying reactive precursors to the PVC skin, typically in a mold. These precursors react and expand to form the polyurethane foam layer, and in the process the polyurethane foam forms an adhesive bond to the skin.

Because the lifetime of an automobile may extend for 10 years or more, this bond between the PVC skin and polyurethane foam layer must be strong and remain strong over an extended time. The strong bond must persist even though the part experiences large temperature extremes, including large swings in temperature over short time periods. In addition, the bond needs to persist as the PVC skin ages. PVC skins used in these applications are heavily plasticized, and the plasticizer tends to migrate from the skin over time, into the atmosphere and/or into the polyurethane foam layer. The loss of plasticizer can lead to shrinkage or other dimensional changes in the skin, which in turn can place additional demands on the adhesive bond.

Recent styling developments are placing greater demands on the performance of the PVC skin. There is a trend towards using lighter colors. The lighter-colored materials are much more susceptible to color change as the PVC ages, tending to become darker, yellower and redder. Another important trend is towards so-called "seamless" airbags. Airbags are usually positioned under automotive interior trim components and burst through those components when deployed. The PVC skin is weakened, or scored, around the airbag so the PVC material tears easily when the airbag is deployed and does not inhibit the full expansion of the bag. Originally, this scoring appeared on the exterior side of the skin, but more recent designs move the scoring to the interior side of the skin, so it is not visible. However, the score lines often become visible as the PVC ages. This is a significant aesthetic problem.

New grades of PVC resins were needed to accommodate the lighter colors and seamless airbag designs. The new resins tend to be lower in molecular weight and more heavily plasticized. The higher plasticization level in particular can make it difficult to obtain the needed adhesion to the polyurethane foam layer.

Adhesion between the PVC skin and polyurethane can be evaluated using a 90° peel test such as the PV2034 peeling method. The mode of failure is important on this test. Adhesive failure, indicated by a clean separation of the skin from the foam layer, indicates very poor adhesion and is unacceptable. The needed mode of failure is cohesive failure. Cohesive failure is indicated by a thin residue of foam remaining attached to the peeled PVC skin. Cohesive failure indicates that a satisfactory bond had formed between foam and skin, and also that the foam layer itself is not excessively friable. It is difficult to obtain the desired failure mode using conventional semi-flexible polyurethane foam formulations, especially with the more highly plasticized PVC skins that have been coming into more frequent use in these applications.

A method for providing better foam adhesion to the skin layer, which does not adversely affect foam properties, is desired.

This invention is in one aspect a method for forming a skinned composite comprising forming a layer of a polyurethane-forming reaction mixture against a skin layer, and then curing the reaction mixture to form a polyurethane layer adhering to the skin, wherein the polyurethane-forming reaction mixture comprises a) one or more polyols;
b) one or more organic polyisocyanates;
c) at least one blowing agent;
d) at least one catalyst for the reaction of isocyanate groups towards hydroxyl groups;

wherein component a) includes at least one polyester polyol, and/or component b) includes at least one isocyanate-terminated prepolymer which is a reaction product of a polyester polyol with an excess of one or more polyisocyanates, and further wherein the polyester polyol in component a) and/or present in an isocyanate-terminated prepolymer included within component b) constitutes from 0.5 to 7% of the combined weight of components a) and b);

and further wherein component a) contains from 0.01 to 1% by weight of a Bronsted acid having a molecular weight of up to about 400, based on the combined weight of the polyols and the Bronsted acid.

Applicants have surprisingly found that the presence of a small amount of Bronsted acid together with a small amount of polyester polyols leads to a very significant improvement in adhesion to the skin material. This result is obtained even when the skin is a very highly plasticized PVC skin material that often does not adhere well to a conventional polyurethane foam layer. The improved adhesion depends on the presence of both the polyester polyol and the Bronsted acid, as the absence of either leads to significantly poorer adhesion. Even more surprising is that, despite the presence of the acid, which might be expected to interfere with the activity of amine catalysts in the formulation, the reaction mixture cures efficiently over a range of amine catalyst levels. The improved adhesion therefore is not believed to be attributable to a catalytic effect.

The invention is also a skinned composite made in accordance with the foregoing process of the invention.

The FIGURE is a diagram of a test mold used in the various examples.

The composite is made by forming a layer of the polyurethane-forming reaction mixture against the skin layer, and then curing the reaction mixture to form a polyurethane layer adhering to the skin. In preferred embodiments, the composite further includes a substrate, in which case the polyurethane-forming reaction mixture is formed into a layer between skin and substrate, and cured to form a polyurethane layer intermediate to skin and substrate and adhering to both. It is often convenient to perform this operation in a mold. For example, the skin can be positioned into one mold half, and the polyurethane-forming reaction mixture introduced on top of the skin. The substrate is positioned in the mold, leaving a gap corresponding to the desired thickness of the cured polyurethane, and the polyurethane forming reaction mixture is then cured in the mold between the skin and substrate. The reaction mixture expands as it cures to fill the space between skin and substrate. The polyurethane-forming reaction is exothermic; therefore it may not be necessary to apply heat to promote the cure, although it is within the scope of invention to do so. The temperature should not be allowed to exceed the melting temperature of the skin, and should not be so high that the substrate melts, degrades or becomes distorted. Curing in the mold is continued until an adhesive bond is formed between skin, polyurethane layer and substrate, which bond is strong enough to allow the composite to be demolded without permanent damage.

The skin thickness is typically from 0.25 to 6 mm, more typically from 0.5 to 2 mm. The skin can be formed in any suitable manner, including various extrusion and casting methods, but a preferred method for making the skin is a dip molding or slush molding method. The skin can include various surface features such as grain or other surface texturing, such as to simulate the appearance of natural leather. In certain embodiments, the skin contains weakened areas such as score lines, which allow the skin to split along predetermined lines when subjected to certain applied forces, such as the deployment of an airbag. Such score lines may be present on the exposed and/or inner surface of the skin, The skin preferably is made of at least one plasticized thermoplastic polymer. The thermoplastic polymer may be, for example, a polymer or copolymer of vinyl chloride; a polymer of copolymer of vinylidene chloride, a polyolefin such as polyethylene, polypropylene, a thermoplastic polyurethane and the like. Polymers and copolymers of vinyl chloride are preferred thermoplastic films.

The plasticizer is a solvent for the thermoplastic polymer, preferably one that has a boiling temperature of at least 150 C, more preferably at least 200 C, and which has a low vapor pressure at temperatures of 100 C and below. The plasticizer preferably has a molecular weight of at least 100, preferably at least 200, more preferably at least 250, and may have a molecular weight of as much as 4000, but more typically no greater than about 1500.

Among the suitable plasticizers are various carboxylic ester compounds such as bis(2-ethylhexyl) phthalate, diisononyl phthalate, bis(n-butyl) phthalate, butyl benzyl phthalate, diisodecyl phthalate, diethyl phthalate, diisobutyl phthalate, di-n-hexyl phthalate, trimethyl trimellitate, tri-(2-ethylhexyl)trimellitate, tri-(n-octyl,n-decyl)trimellitate, tri-(heptyl,nonyl)trimellitate, n-octyl trimellitate, bis(2-ethylhexyl)adipate, dimethyl adipate, monomethyl adipate, diocctyl adipate, dibutyl sebacate, dibutyl maleate, diisobutyl maleate, various benzoate esters, various vegetable oils and modified vegetable oils (such as epoxidized vegetable oils, various sulfonamides such as n-ethyl toluene sulfonamide, n-(2-hydroxypropyl)benzene sulfonamide, N-(n-butyl)benzene sulfonamide (DOA) and the like, various phosphate esters such as tricresyl phosphate and tributyl phosphate, glycol esters such as triethylene glycol dihexanoate and tetraethylene glycol diheptanoate and the like, polybutene polymers, various acetylated monoglycerides, alkyl citrates such as triethyl citrate, acetyl triethyl citrate, tributyl citrate, triocyl citrate, acetyl trioctyl citrate, acetyl trihexyl citrate, butyryl trihexyl citrate and the like; alkyl sulphonic acid phenyl ester, 1,2-cyclohexane dicarboxylate diesters such as 1,2-cyclohexane diisononyl ester, and the like.

The proportions of the thermoplastic polymer and the plasticizer in the skin layer are selected to provide the requisite physical properties (notably flexibility) to the skin. The plasticizer may constitute, for example, from 10 to 50% of the combined weight of the thermoplastic polymer and plasticizer. The invention is particularly suitable for use with skin materials having somewhat high levels of plasticizer such as, for example, from 20 to 50%, especially 25 to 45% by weight plasticizer, based on the combined weight of plasticizer and thermoplastic polymer.

An especially preferred skin layer is a polymer or copolymer of vinyl chloride that contains from 20 to 50%, especially 25 to 45% by weight plasticizer, based on the combined weight of plasticizer and thermoplastic polymer.

The skin may contain small amounts of other materials as may be useful. Among these are various colorants, which may be solid pigments and/or various types of dyes. The skin may contain one or more stabilizers, fillers, preservatives, biocides, UV blockers, flame retardants, and the like.

The substrate, if present, can be made of a wide variety of substances, such as an engineering thermoplastic or thermoset resin, wood, metal, ceramic, or other material that meets the requirements of the intended use for the composite. The substrate needs to be able to withstand the conditions of the polyurethane-forming reaction. The function of the substrate in most cases is to provide rigidity, fix the general dimensions and shape of the composite, and provide for points of attachment to other members or auxiliaries.

The polyurethane layer is adhered to the skin layer and, if a substrate is used, is interposed between and adhered to the skin layer and the substrate. The polyurethane layer may have a thickness, for example, from as little as about 0.5 mm to 25 mm or more. A preferred thickness is 1 to 12 mm and a still more preferred thickness is 3 to 8 mm. The polyurethane layer may be cellular or non-cellular, and thus may have a bulk density of as little as about 24 kg/m$^3$ to as much as about 1200 kg/m$^3$.

The polyurethane foam layer is produced by curing a polyurethane-forming reaction mixture. The polyurethane-forming reaction mixture includes a) one or more polyols, b) one or more polyisocyanates, c) at least one blowing agent and d) at least one catalyst for the reaction of isocyanate groups towards hydroxyl groups.

A polyester polyol constitutes from 0.25 to 7% of the combined weight of components a) and b). A preferred amount is 0.5 to 5% and a more preferred amount is 1 to 5%. The polyester polyol can be pre-reacted with an excess of a polyisocyanate to form an isocyanate-terminated prepolymer that, in turn, forms all or part of component b). Alternatively, the polyester polyol can form a portion of component a). It is possible to add a portion of the polyester polyol as part of component a) and another portion of the polyester polyol in the from of a prepolymer that forms all or part of component b).

The polyester polyol contains multiple ester groups per molecule and has an average of at least 2 hydroxyl groups per molecule. It may contain up to 6 hydroxyl groups per molecule, but typically will contain up to about 3 hydroxyl groups per molecule. The hydroxyl equivalent weight can range from about 75 to 3000. A preferred hydroxyl equivalent weight is 350 to 1500.

Suitable polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerin, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful.

The polyester polyol has a low acid number (typically lower than 10, more preferably lower than 1) indicating the near- or total absence of acid terminal groups and is not counted as any part of the Bronsted acid.

Aliphatic polyesters having a hydroxyl functionality of at least 2.0 and a hydroxyl equivalent weight of about 350 to 1500 are preferred. These aliphatic polyesters are preferably a reaction product of an aliphatic dicarboxylic acid (or corresponding acid chloride or diester) with at least one polyol having at least 2 hydroxyl groups and a hydroxyl equivalent weight of 150 or less, and are preferably branched due to the use of at least one tri- or higher functionality polyol and/or a diol having alkyl side groups (such as neopentyl glycol) as a starting material for the aliphatic polyester.

Component a) includes one or more polyols that do not contain ester groups. Examples of suitable polyols include hydroxy-functional polybutadiene polymers, polyether polyols, as well as low molecular weight compounds such as, for example, ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, cyclohexanedimethanol, triethanolamine, tri(isopropanol)amine, glycerin, trimethylol propane, trimethylol ethane, pentaerythritol, sucrose, sorbitol, diethanol amine, diisopropanol amine, monoethanol amine and monoisopropanolamine.

Component a) preferably includes at least one polyether polyol. Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers, random copolymers of propylene oxide and ethylene oxide in which the oxyethylene content is, for example, from about 1 to about 30% by weight, ethylene oxide-capped poly(propylene oxide) polymers which contain from 70 to 100% primary hydroxyl groups, and ethylene oxide-capped random copolymers of propylene oxide and ethylene oxide in which the oxyethylene content is from about 1 to about 30% by weight. The polyether polyols may contain low amounts of terminal unsaturation (for example, less than 0.02 meq/g or less than 0.01 meq/g), such as those made using so-called double metal cyanide (DMC) catalysts as described, for example, in U.S. Pat. Nos. 3,278,457, 3,278,458, 3,278,459, 3,404,109, 3,427,256, 3,427,334, 3,427,335, 5,470,813 and 5,627,120. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles, in a polyol, typically a polyether polyol. Suitable polymer polyols are described in U.S. Pat. Nos. 4,581,418 and 4,574,137.

The reaction mixture preferably includes at least one high functionality polyether polyol having a hydroxyl functionality of at least 4, more preferably at least 6. This polyol preferably has a hydroxyl equivalent weight of 80 to 500, more preferably 80 to 250. This high functionality polyether polyol may be present as the sole polyol (other than the polyester polyol), but more typically this high functionality polyether polyol will be present in admixture with one or more additional polyols. Polyol blends of interest include, for example:

1) a blend of the high functionality polyether polyol with at least one low equivalent weight polyol or aminoalcohol that lacks ester groups and has an equivalent weight per isocyanate group of up to about 125, more preferably up to 75, and a functionality of 2 to 4, preferably 3 to 4. The low equivalent weight polyol may be, for example, glycerin, trimethylolpropane, trimethylolethane, triethanolamine or propoxylates thereof;

2) a blend of the high functionality polyether polyol with one or more high equivalent weight polyols, the high equivalent weight polyol lacking ester groups and having a functionality of 2 to 3 and an equivalent weight of at least 250, more preferably at least 350, to 3000, preferably to 2200. The high equivalent weight polyol is preferably one or more polyether polyols. This polyether polyol is most preferably a polymer or copolymer of propylene oxide.

3) a blend of the high functionality polyether polyol, a low equivalent weight polyol as described in 1) and a high equivalent weight polyol as described in 2).

Component a) contains from 0.01 to 1% by weight of a Bronsted acid having a molecular weight of up to about 400, based on the combined weight of the polyols and the Bronsted acid. A preferred amount is from 0.02 to 0.3% by weight, on the same basis.

The Bronsted acid contains at least one acidic hydrogen. Preferably the Bronsted acid includes at least one acidic hydrogen that has a pKa of 5.5 or less at 25° C. The Bronsted acid may have multiple acidic hydrogens that each have an associated pKa; in such a case, only one of these needs to have a pKa of 5.5 or less.

Examples of suitable Bronsted acids include carboxylic acids such as formic acid, acetic acid and other alkanoic acids, especially those having up to eight, preferably up to four carbon atoms; mineral acids such as sulfuric acid, hydrochloric acid, nitric acid, phosphoric acid and the like; organic sulfonic acids such as benzene sulfonic acid, alkyl benzene sulfonic acids in which the alkyl group contains 1 to 20 carbon atoms, and the like.

Component b) is one or more organic polyisocyanates. The organic isocyanate compound(s) contain an average of at least 1.5 and preferably at least 2.0 isocyanate groups per molecule. The polyisocyanate(s) may contain an average as many as 8 isocyanate groups per molecule, but typically contain no more than about 4 isocyanate groups per molecule on average. The organic polyisocyanate may have an isocyanate equivalent weight as little as about 85 and as much as about 2000. The functionality and isocyanate equivalent weight of the isocyanate compounds is in any event selected together with the isocyanate index and the equivalent and functionality of the isocyanate-reactive compounds (including any water as may present) such that the molecular weight between crosslinks is as described before.

The isocyanate groups may be bonded to aromatic, aliphatic or cycloaliphatic carbon atoms. Examples of suitable isocyanate compounds include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'- diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate compound is diphenylmethane-4,4'-diisocyanate, diphenylmethane-2,4'-diisocyanate, PMDI, toluene-2,4-diisocyanate, toluene-2,6-diisocyanate or mixtures of any two or more thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophanate, uretonimine, isocyanurate, amide or like linkages. Examples of modified isocyanates of these types include various urethane group and/or urea group-containing prepolymers, so-called "liquid MDI" products, and the like. A urethane group-containing prepolymer include or consist of a reaction product of the polyester polyol and an organic polyisocyanate.

The amount of polyisocyanate is generally defined by "isocyanate index", which is 100 times the ratio of isocyanate groups to isocyanate-reactive groups in the reaction mixture. The isocyanate index may be as low as 75, but preferably is at least 95 and more preferably at least 100. The isocyanate index preferably is not greater than 1.5 and more preferably is not greater than 1.25.

The blowing agent (component c)) may be a physical (endothermic) type such as a hydrocarbon, hydrofluorocarbon, fluorocarbon, fluorochlorocarbon, hydrofluorochlorocarbon, dialkyl ether or other low-boiling organic compound that is not reactive with isocyanate groups. The blowing agent may also be a reactive type such as a carbamate or, preferably water. Water or a mixture of water and a physical blowing agent is preferred. The amount of blowing agent is selected to provide the desired amount of expansion. Preferably, enough blowing agent is included to produce a foam density of 24 to 750 kg/m³, more preferably from 80 to 500 kg/m³.

The polyurethane-forming reaction mixture contains d) one or more catalysts for the reaction of isocyanate groups towards isocyanate-reactive groups. Among the useful catalysts include various tertiary amine compounds, various tin compound and other metal polyurethane catalysts, including those described, for example, in U.S. Pat. No. 4,390,645. A preferred type of catalyst is a so-called "reactive" amine catalyst that contains at least one tertiary amino group and at least one isocyanate-reactive group, typically a hydroxyl, primary amino or secondary amino group. Catalysts of this type react into the polymer structure as the reaction mixture cures. Examples of reactive amine catalysts include 2-propanol,1,1'-[[3-(dimethylamino)propyl]imino]bis-, 1,3-propanediamine,N-1-[2-[2[(dimethylamino)ethoxy]ethyl]-N-1-methyl, ethanol,2-[[2-[2-(dimethylamino)ethoxy]ethyl] methylamino, and 1,3-propanediamine,N-3-[3-(dimethylamino)propyl]-N-1,N-1-dimethyl, and the like. The reaction mixture preferably is substantially devoid of catalytic materials that strongly catalyze the trimerization of isocyanate groups to form isocyanurate groups.

The reaction mixture may contain one or more optional ingredients in addition to those described above. Among such optional ingredients are one or more polyamines such as amine-terminated polyethers, toluene diamine, phenylene diamine, diphenylmethane diamine, bis(3-chloro-4-aminophenyl)methane and 2,4-diamino-3,5-diethyl toluene diethyltoluene, ethylene diamine and the like.

The reaction mixture may contain one or more surfactants (particularly if the polyurethane is to be cellular). Examples of suitable surfactants include alkali metal and amine salts of fatty acids; alkali metal and amine salts of sulfonic acids; siloxane-oxyalkylene polymers or copolymers and other organopolysiloxanes; oxyethylated alkylphenols; oxyethylated fatty alcohols such as Tergitol 15-S-9, from The Dow Chemical Company; paraffin oils; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 2 parts by weight based on 100 parts by weight of the polyols. Organosilicone surfactants are generally preferred types.

The reaction mixture may in addition contain other optional ingredients such as, for example, one or more physical blowing agents, one or more fillers, one or more colorants, one or more reinforcing agents, antioxidants, UV absorbers, flame retardants, biocides, and the like.

In some embodiments, the polyurethane has a calculated molecular weight per crosslink of no greater than 1250 as calculated by the formula $$MW_{xl} = \frac{A+B}{\frac{A(C-2)}{CD} + \frac{B(F-2)}{EFG} + \frac{B(F-1)\left(1-\frac{1}{E}\right)}{(E+1)G}}$$

wherein
A is the combined weight, in grams, of all isocyanate-reactive materials that contain at least 2 isocyanate-reactive groups/molecule (including any water) provided to the reaction mixture;
B is the combined weight, in grams, of all isocyanate compounds provided to the reaction mixture;
C is average functionality of all isocyanate-reactive compounds provided to the reaction mixture that contain at least 2 isocyanate-reactive groups/molecule (including any water);
D is the average equivalent weight in grams per hydroxyl group of all isocyanate-reactive compounds provided to the reaction mixture that contain at least 2 isocyanate-reactive groups/molecule (including any water);
E is the isocyanate index, calculated as the number of equivalents of isocyanate groups provided to the reaction mixture divided by the number of equivalents of isocyanate-reactive groups provided to the reaction mixture;
F is the average functionality of all isocyanate compounds provided to the reaction mixture; and
G is the average equivalent weight in grams per isocyanate group of all isocyanate compounds provided to the reaction mixture.

When the molecular weight per crosslink is 1250 or below, the skin performs better in several respects. It retains its original color better on accelerated aging tests. Adhesion to the polyurethane layer is often significantly improved after accelerated aging. The skin is less prone to shrinkage and other physical property loss over time. In addition, score lines on the underside of the skin (such as for so-called seamless airbag designs) tend to remain invisible longer that when the polyurethane has a greater molecular weight between crosslinks.

Composites of the invention are useful in a wide range of vehicular and construction applications. Because the skin layer is primarily decorative in function, the composites are especially useful as trim or decorative members. In vehicular applications, composites of the invention can be used, for example, as instrument panels; interior door panels; rear window shelves, steering wheels, console covers, and the like.

The following examples are provided to illustrate the invention but are not intended to limit the scope thereof. All parts and percentages are by weight unless otherwise indicated.

EXAMPLE 1 AND COMPARATIVE SAMPLES A-C

Skinned polyurethane foam composites are made in a step mold as shown in FIG. 1. The step mold is 140 cm in length, 20 cm in width and has a thickness that varies from 3 to 20 mm. PVC skins are produced using a light-colored, highly (25-45%) plasticized, low molecular weight PVC designed for seamless airbag instrument panels. 10×15 cm sections of skin are introduced into areas A, B, H and I of the mold (see FIG. 1). A polyurethane-forming reaction mixture is introduced into the mold at the pouring zone located in section E of the mold.

In each of Example 1 and Comparative Samples A-C, the polyurethane-forming reaction mixture has the formulation indicated in Table 1. The Example 1 formulation contains both polyester polyol and acid (formic acid). Comparative Sample A contains neither the polyester nor the acid. Comparative Sample B contains the polyester only, and Comparative Sample C contains the acid only.

The reaction mixture is formulated into polyol and isocyanate components as indicated in Table 1. These components are mixed at 25° C. at a 105 index and immediately poured into the mold. The mold is preheated to 50° C. Demold time is 180 seconds. The cured polyurethane foam has a density of about 145 kg/m³.

Immediately after demolding, the PVC skins are pulled away from the laminate at a 90° angle. The surface of the exposed skin layer is examined to assess failure mode. The percentage of total skin area at which the desired cohesive failure occurs (as indicated by the presence of a small layer of foam on the skin surface) is estimated. Results are as indicated in Table 2.

TABLE 1

| Ingredient | Comp. Sample A | Comp. Sample B | Comp. Sample C | Ex. 1 |
|---|---|---|---|---|
| Polyol Component | | | | |
| 2040 equivalent weight, nominally trifunctional ethylene oxide-capped poly(propylene oxide) | 40 | 40 | 40 | 40 |
| 1902 equivalent weight, nominally trifunctional ethylene oxide-capped poly(propylene oxide) | 40.2 | 37.2 | 40.12 | 37.12 |
| 1675 equivalent weight, nominally trifunctional high-ethylene oxide polyol | 2 | 2 | 2 | 2 |
| 200 equivalent weight, sucrose-glycerin initiated propylene oxide/ethylene oxide random copolymer | 10 | 10 | 10 | 10 |
| Reactive amine catalyst mixture | 1.1 | 1.1 | 1.1 | 1.1 |
| Silicone surfactant | 0.5 | 0.5 | 0.5 | 0.5 |
| Glycerin | 0.5 | 0.5 | 0.5 | 0.5 |
| Antioxidant | 0.2 | 0.2 | 0.2 | 0.2 |
| Water | 2.5 | 2.5 | 2.5 | 2.5 |
| 2100 molecular weight, 2.5-functional adipic acid-based polyester polyol | 0 | 3 | 0 | 3 |
| Formic Acid | 0 | 0 | 0.08 | 0.08 |
| Polyisocyanate Component | | | | |
| Mixture of uretonimine-modified MDI, polymeric MDI and MDI prepolymer. | To 105 index | To 105 index | To 105 index | To 105 index |

TABLE 2

| Test | Comp. Sample A* | Comp. Sample B* | Comp. Sample C* | Ex. 1 |
|---|---|---|---|---|
| Polyester polyol, pbw in polyol | 0 | 3 | 0 | 3 |
| Formic acid, pbw in polyol | 0 | 0 | 0.08 | 0.08 |
| Cohesion Failure, area A | 0 | 13 | 4 | 100 |
| Cohesion Failure, area B | 0 | 78 | 4 | 100 |
| Cohesion Failure, area H | 0 | 87 | 0 | 100 |
| Cohesion Failure, area I | 0 | 55 | 1 | 100 |
| Cohesion Failure, average | 0 | 58 | 1.8 | 100 |

As the data in Table 2 indicates, the polyester by itself (Comp. Sample B) provides some improvement in adhesion. The formic acid by itself (Comp. Sample C) has essentially no benefit. However, when both the polyester polyol and formic acid are present, excellent adhesion is obtained in all areas of the skinned composite, including areas A and I, which are farthest from the pouring zone and typically would be most susceptible to poor adhesion.

EXAMPLES 2-4 AND COMPARATIVE SAMPLE D

Skinned polyurethane foam Examples 2-4 and Comparative Sample D are made and tested in the same general manner as described for Example 1, using the polyurethane foam formulations described in Table 3. In this case, the polyester polyol is incorporated into a prepolymer that constitutes part of the polyisocyanate component. The PVC skin in this case is a low molecular weight, highly (25-45%) plasticized grade designed for seamless airbag instrument panels. Results are as indicated in Table 4.

TABLE 3

| Ingredient | Comp. Sample D | Ex. 2 | Ex. 3 | Ex. 4 |
|---|---|---|---|---|
| Polyol Component | | | | |
| 2040 equivalent weight, nominally trifunctional ethylene oxide-capped poly(propylene oxide) | 41.6 | 41.6 | 41.6 | 41.6 |
| 1902 equivalent weight, nominally trifunctional ethylene oxide-capped poly(propylene oxide) | 41.7 | 41.62 | 41.6 | 41.6 |
| 1675 equivalent weight, nominally trifunctional high-ethylene oxide polyol | 2 | 2 | 2 | 2 |
| 125 equivalent weight amine-initiated polyol | 10 | 10 | 10 | 10 |
| Reactive amine catalyst mixture | 0.5 | 0.5 | 0.5 | 0.5 |
| Silicone surfactant | 0.5 | 0.5 | 0.5 | 0.5 |
| Glycerin | 0.5 | 0.5 | 0.5 | 0.5 |
| Water | 3 | 3 | 3 | 3 |
| Formic Acid | 0 | 0.08 | 0 | 0 |
| Acetic Acid | 0 | 0 | 0.1 | 0 |
| Dodecylbenzenesulfonic acid | 0 | 0 | 0 | 0.1 |
| Polyisocyanate Component | | | | |
| Prepolymer made from 4.3 parts of a 2100 molecular weight, 2.5-functionality adipic acid-based polyester polyol, 23 parts uretonimine-modified MDI, 34 parts polymeric MDI and 38.3 parts of an MDI/tripropylene glycol prepolymer. | To 105 index | To 105 index | To 105 index | To 105 index |

TABLE 4

| Test | Comp. Sample A* | Ex. 1 | Ex. 2 | Ex. 3 |
|---|---|---|---|---|
| Polyester polyol, pbw in isocyanate component | 4.3 | 4.3 | 4.3 | 4.3 |
| Acid, pbw in polyol | 0 | 0.08 | 0.1 | 0.1 |
| Cohesion Failure, area A | 35 | 100 | 100 | 100 |
| Cohesion Failure, area B | 100 | 100 | 100 | 100 |
| Cohesion Failure, area H | 100 | 100 | 100 | 100 |
| Cohesion Failure, area I | 100 | 100 | 100 | 100 |
| Cohesion Failure, average | 83.8 | 100 | 100 | 100 |

EXAMPLES 5-7

Skinned polyurethane foam Examples 5-7 are made and tested in the same general manner as described for Example 1, using the polyurethane foam formulations described in Table 5. In addition, curing characteristics of the foam formulations are evaluated. The PVC skin in this case is molded from a low molecular weight, highly (25-45%) plasticized grade for seamless airbag instrument panels. Results are as indicated in Table 6.

TABLE 5

| Ingredient | Ex. 5 | Ex. 6 | Ex. 7 |
|---|---|---|---|
| Polyol Component | | | |
| 2040 equivalent weight, nominally trifunctional ethylene oxide-capped poly(propylene oxide) | 40.1 | 40.1 | 40.1 |
| 1902 equivalent weight, nominally trifunctional ethylene oxide-capped poly(propylene oxide) | 37.62 | 37.42 | 37.12 |
| 1675 equivalent weight, nominally trifunctional high-ethylene oxide polyol | 2 | 2 | 2 |
| 125 equivalent weight amine-initiated polyol | 10 | 10 | 10 |
| Reactive amine catalyst mixture | 0.5 | 0.7 | 1.0 |
| Silicone surfactant | 0.5 | 0.5 | 0.5 |
| Glycerin | 0.5 | 0.5 | 0.5 |
| Water | 3 | 3 | 3 |
| Formic Acid | 0 | 0.08 | 0 |
| Polyisocyanate Component | | | |
| Mixture of uretonimine-modified MDI, polymeric MDI and MDI prepolymer. | To 105 index | To 105 index | To 105 index |

TABLE 6

| Test | Ex. 5 | Ex. 6 | Ex. 7 |
|---|---|---|---|
| 2100 molecular weight, 2.5 functionality adipic acid-based polyester polyol, pbw in isocyanate component | 3.0 | 3.0 | 3.0 |
| Acid, pbw in polyol | 0.08 | 0.08 | 0.08 |
| Amine catalysts, pbw in polyol | 0.5 | 0.7 | 1.0 |
| Cohesion Failure, average | 100 | 100 | 100 |
| Cream time, s | 15 | 15 | 13 |
| Gel time, s | 90 | 80 | 57 |
| Rise time, s | 140 | 125 | 92 |
| Tack-free time, s | >240 | >240 | 155 |

The results shown in Table 6 demonstrate that the beneficial effects of the invention are not due to complexation of the amine catalyst with the acid. Excellent adhesion results are seen at various amine catalyst levels, which result in large differences in the curing profile between Examples 5, 6 and 7. Despite the faster curing rates of Examples 6 and 7, excellent adhesive properties are obtained.

What is claimed is:

1. A method for forming a skinned composite comprising forming a layer of a polyurethane-forming reaction mixture against a plasticized thermoplastic skin layer that contains 25 to 45% by weight of plasticizer, based on the combined weight of plasticizer and thermoplastic skin layer, and then curing the reaction mixture to form a polyurethane layer adhering to the skin, wherein the polyurethane-forming reaction mixture comprises
   a) one or more polyols;
   b) one or more organic polyisocyanates;
   c) at least one blowing agent selected from water or a mixture of water and a hydrocarbon, hydrofluorocarbon, fluorocarbon, fluorochlorocarbon, hydrofluorochlorocarbon or dialkyl ether physical blowing agent in an amount sufficient to provide a foam density of 80 to 500 kg/m$^3$;
   d) at least one catalyst for the reaction of isocyanate groups towards hydroxyl groups;
   wherein component a) includes at least one polyester polyol, and/or component b) includes at least one isocyanate-terminated prepolymer which is a reaction product of a polyester polyol with an excess of one or more polyisocyanates, and further wherein the at least one polyester polyol in component a) and/or provided in the preparation of the at least one isocyanate-terminated prepolymer included within component b) constitutes from 0.5 to 7% of the combined weight of components a) and b);
   and further wherein the polyurethane-forming reaction mixture contains from 0.02 to 0.3% by weight of a Bronsted acid having a molecular weight of up to about 400 selected from one or more of formic acid, acetic acid, an alkanoic acid having three to eight carbon atoms, sulfuric acid, hydrochloric acid, nitric acid, phosphoric acid, benzene sulfonic acid and an alkyl benzene sulfonic acid in which the alkyl group contains 1 to 20 carbon atoms, based on the combined weight of the a) one or more polyols and the Bronsted acid.

2. The method of claim 1, wherein the Bronsted acid is formic acid or acetic acid.

3. The method of claim 2 wherein the at least one polyester polyol included in component a) or provided in the preparation of the at least one isocyanate-terminated prepolymer in component b) has a hydroxyl functionality of at least 2.0 and an equivalent weight of 350 to 1500.

4. The method of claim 3 wherein the at least one polyester polyol included in component a) or provided in the preparation of the at least one isocyanate-terminated prepolymer in component b) is an aliphatic polyester which is a reaction product of an aliphatic dicarboxylic acid or corresponding acid chloride or diester with at least one polyol having at least 2 hydroxyl groups and a hydroxyl equivalent weight of 150 or less.

5. The method of claim 4, wherein the a) one or more polyols includes at least one tri- or higher functionality polyol and/or a diol having alkyl side groups.

6. The method of claim 1 wherein the skin is a plasticized polymer of vinyl chloride.

7. The method of claim 1, wherein the polyurethane-forming reaction mixture is formed into a layer between the skin and a substrate, and cured to form a polyurethane layer intermediate to the skin and the substrate and adhering to both.

8. A skinned composite made in accordance with the method of claim 1.

* * * * *